United States Patent
Lesage et al.

(10) Patent No.: US 9,108,466 B2
(45) Date of Patent: Aug. 18, 2015

(54) PNEUMATIC OBJECT HAVING A GAS TIGHT LAYER CONTAINING A SPECIFIC SIBS THERMOPLASTIC ELASTOMER

(75) Inventors: Pierre Lesage, Clermont-Ferrand (FR); Emmanuel Custodero, Chamaliéres (FR); Julien Thuilliez, La Roche Blanche (FR); Marc Greiveldinger, Chatel Guyon (FR)

(73) Assignees: Michelin Recherche et Technique S.A., Granges-Faccet (CH); COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 600 days.

(21) Appl. No.: 13/130,232

(22) PCT Filed: Nov. 17, 2009

(86) PCT No.: PCT/EP2009/008155
§ 371 (c)(1), (2), (4) Date: Aug. 2, 2011

(87) PCT Pub. No.: WO2010/057612
PCT Pub. Date: May 27, 2010

(65) Prior Publication Data
US 2011/0277901 A1 Nov. 17, 2011

(30) Foreign Application Priority Data
Nov. 19, 2008 (FR) ...................................... 08 57845

(51) Int. Cl.
*B60C 1/00* (2006.01)
*B60C 5/14* (2006.01)
*C08L 53/00* (2006.01)
*C08K 5/01* (2006.01)

(52) U.S. Cl.
CPC ................. *B60C 5/14* (2013.01); *B60C 1/0008* (2013.01); *C08L 53/00* (2013.01); *C08K 5/01* (2013.01); *Y10T 152/10495* (2015.01)

(58) Field of Classification Search
CPC ......... B60C 1/0008; B60C 5/14; C08L 53/00; C08K 5/01; Y10T 152/10495
See application file for complete search history.

(56) References Cited

U.S. PATENT DOCUMENTS

| 4,946,899 A | 8/1990 | Kennedy et al. |
| 5,428,111 A | 6/1995 | Faust et al. |
| 2002/0037962 A1 | 3/2002 | Lechtenbohmer et al. |
| 2011/0011511 A1* | 1/2011 | Miyazaki et al. ............. 152/564 |

FOREIGN PATENT DOCUMENTS

| EP | 1 380 604 | 1/2004 |
| JP | 06107896 A * | 4/1994 |

* cited by examiner

*Primary Examiner* — Peter D Mulcahy
(74) *Attorney, Agent, or Firm* — Cozen O'Connor

(57) ABSTRACT

Inflatable article equipped with an elastomer layer impermeable to inflation gases, said elastomer layer comprising at least, as the predominant elastomer, a thermoplastic SIBS elastomer comprising a polyisobutylene block comprising an amount of units derived from one or more conjugated dienes ranging from 0.5% to 6% by weight relative to the weight of the polyisobutylene block, and, at least one of the ends of the polyisobutylene block, a styrenic block representing at most 16% by weight of the total weight of the block copolymer. Preferably the airtight elastomer layer also comprises, as a plasticizing agent, an extender oil for the SIBS elastomer. The inflatable article of the invention is, in particular, an inner tube or a pneumatic tire for a motor vehicle.

23 Claims, No Drawings

US 9,108,466 B2

PNEUMATIC OBJECT HAVING A GAS TIGHT LAYER CONTAINING A SPECIFIC SIBS THERMOPLASTIC ELASTOMER

RELATED APPLICATION

This is a U.S. National Phase Application under 35 USC 371 of International Application PCT/EP2009/008155, filed on Nov. 17, 2009.

This application claims the priority of French patent application no. 08/57845 filed Nov. 19, 2008, the entire content of which is hereby incorporated by reference.

FIELD OF THE INVENTION

The present invention relates to "inflatable" articles, that is to say, by definition, to articles that assume their useable shape when they are inflated with air or with an equivalent inflation gas.

It relates more particularly to the gastight layers that ensure the impermeability of these inflatable articles, in particular that of pneumatic tires.

BACKGROUND OF THE INVENTION

In a conventional pneumatic tire of the "tubeless" type (that is to say of the type without an inner tube), the radially internal face comprises an airtight layer (or more generally a layer that is impermeable to any inflation gas) which enables the pneumatic tire to be inflated and kept under pressure. Its sealing properties enable it to guarantee a relatively low rate of pressure loss, making it possible to keep the tire inflated, in the normal operating state, for a sufficient time, normally several weeks or several months. It also has the role of protecting the carcass reinforcement from the diffusion of air coming from the internal space of the tire.

This role of airtight inner layer or "inner liner" is today fulfilled by compositions based on butyl rubber (isobutylene/isoprene copolymer), long renowned for their excellent sealing properties.

However, one well-known drawback of compositions based on butyl rubber or elastomer is that they have high hysteresis losses, furthermore over a wide temperature range, which drawback degrades the rolling resistance of pneumatic tires.

SUMMARY OF THE INVENTION

One object of the present invention is to reduce the hysteresis of these airtight inner layers and therefore, in fine, the fuel consumption of motor vehicles.

However, the Applicants discovered, during their research, that an elastomer other than butyl rubber makes it possible to obtain airtight inner layers that correspond to such an objective, while providing the latter with very good sealing properties. More particularly, the Applicants discovered that the use of a novel thermoplastic elastomer of SIBS type in airtight inner liners, as a replacement for butyl rubber, gives these liners improved hysteresis properties, while retaining a hot cohesion of the mixture and a capacity for adhesion to the rubber components which are adjacent thereto.

Thus, one aspect of the present invention relates to an inflatable article equipped with an elastomer layer impermeable to inflation gases such as air, said elastomer layer comprising at least, as the predominant elastomer, one novel thermoplastic SIBS elastomer.

Compared with butyl rubbers, SIBS has also the major advantage, due to its thermoplastic nature, of being able to be worked as is in the molten (liquid) state, and consequently of offering a possibility of simplified processing.

The invention particularly relates to inflatable articles made of rubber such as pneumatic tires, or inner tubes, especially inner tubes for a pneumatic tire.

The invention relates more particularly to the pneumatic tires intended to be fitted on motor vehicles of the passenger type, SUV (Sport Utility Vehicle) type, two-wheeled vehicles (especially motorcycles), aircraft, such as industrial vehicles chosen from vans, heavy vehicles—that is to say underground trains, buses, road transport vehicles (lorries, towing vehicles, trailers), off-road vehicles, such as agricultural and civil-engineering vehicles—and other transport or handling vehicles.

Another aspect of the invention relates to a process for sealing an inflatable article with respect to inflation gases, in which a gastight elastomer layer as defined above is incorporated into said inflatable article during its manufacture or is added to said inflatable article after its manufacture.

Another aspect of the invention relates to the use, in an inflatable article, of an elastomer layer as defined above as a layer impermeable to inflation gases.

In the present description, unless otherwise indicated, all the percentages (%) indicated are % by weight.

In the description of the invention that follows, the expressions "SIBS elastomer", "thermoplastic elastomer block copolymer" and "block copolymer" are equivalent and will be able to be used equally.

Moreover, any range of values denoted by the expression "between a and b" represents the range of values extending from more than a to less than b (that is to say limits a and b excluded) whereas any range of values denoted by the expression "from a to b" means the range of values extending from a up to b (that is say including the strict limits a and b).

Thus, a first subject of the invention is an inflatable article that has the main feature of being provided with at least one gastight elastomer layer or composition that comprises at least, as the predominant elastomer (by weight), one thermoplastic SIBS elastomer in the form of a block copolymer comprising at least one elastomeric block composed predominantly of the polymerized isobutylene monomer and, at least at one of the ends of the block copolymer, a styrenic block constituted of at least one polymerized styrenic compound. This thermoplastic elastomer block copolymer has the following structural features:

1) the polyisobutylene block has a number-average molecular weight ("$M_n$") ranging from 25,000 g/mol to 350,000 g/mol and a glass transition temperature ("$T_g$") of less than or equal to −20° C., and comprises an amount of units derived from one or more conjugated dienes inserted in the polymer chain ranging from 0.5% to 6% by weight relative to the weight of the polyisobutylene block;

2) the styrenic block or blocks represent at most 16% by weight of the total weight of the block copolymer.

Thus, this styrenic thermoplastic elastomer in the form of a block copolymer comprises at least two blocks.

According to one variant of the invention, the thermoplastic elastomer block copolymer is in a linear triblock form. The block copolymer is then composed of a central polyisobutylene block and of two terminal styrenic blocks at each of the two ends of the polyisobutylene block.

According to another variant of the invention, the thermoplastic elastomer block copolymer is in a star-shaped form, with at least three branches. The block copolymer is then composed of a star-shaped central polyisobutylene block with at least three branches and of a styrenic block at the end of each of the branches of the polyisobutylene. The number of branches of the polyisobutylene varies from 3 to 12, and preferably from 3 to 6.

According to another variant of the invention, the thermoplastic elastomer block copolymer is in a branched or dendrimer form. The block copolymer is then composed of a branched or dendritic central polyisobutylene block and of a styrenic block at the end of the branches of the dendritic polyisobutylene.

According to an embodiment of the invention, it is preferred for the glass transition temperature ($T_g$, measured according to ASTM D3418) of the thermoplastic elastomer block copolymer to be less than −20° C., more preferably less than −40° C. A $T_g$ value above these minimum values may reduce the performances of the airtight layer during use at very low temperature; for such a use, the $T_g$ of the block copolymer is more preferably still less than −50° C.

The number-average molecular weight (denoted by $M_n$ of the block copolymer is preferably between 30,000 and 500,000 g/mol, more preferably between 40,000 and 400,000 g/mol. Below the minimum values indicated, the cohesion between the SIBS elastomer chains especially due to its optional dilution (in the presence of an extender oil), runs the risk of being adversely affected; moreover, an increase in the usage temperature runs the risk of affecting the mechanical properties, especially the properties at break, consequently leading to reduced "hot" performance. Moreover, too high a weight $M_n$ may be detrimental as regards the flexibility of the gastight layer. Thus, it has been observed that a value lying within a range of 50,000 to 300,000 g/mol was particularly suitable, especially for use of the block copolymer in a composition for a pneumatic tire.

The polydispersity index $I_p$ (N.B: $I_p=M_w/M_n$ where $M_w$ is the weight-average molecular weight) of the block copolymer is preferably less than 3, more preferably $I_p$ is less than 2 and more preferably still less than 1.5.

According to an embodiment of the invention, the polyisobutylene block of the block copolymer has a number-average molecular weight ("$M_n$") ranging from 25 000 g/mol to 350 000 g/mol, preferably 35 000 g/mol to 250 000 g/mol so as to give the TPE good elastomeric properties and a sufficient mechanical strength that is compatible with the inner liner application of a pneumatic tire.

According to an embodiment of the invention, the polyisobutylene block of the block copolymer also has a glass transition temperature ("$T_g$") of less than or equal to −20° C., more preferably of less than −40° C. A $T_g$ above these minimum values may reduce the performances of the airtight layer during use at very low temperature; for such a use, the $T_g$ of the polyisobutylene block is more preferably still less than −50° C.

According to an embodiment of the invention, the polyisobutylene block of the block copolymer also comprises an amount of units derived from one or more conjugated dienes inserted in the polymer chain ranging from 0.5% to 6% by weight relative to the weight of the polyisobutylene block. Below 0.5%, a degradation of the property of adhesion of the composition containing the block copolymer of the invention to the adjacent rubber compositions in the tire is observed. Above 6%, a drop in the resistance to thermal oxidation and to ozone oxidation of the composition containing the block copolymer of the invention used in a tire is observed. This amount is preferably within the range extending from 1.5% to 5% by weight and more preferably still from 2% to 4% by weight.

The conjugated dienes that may be copolymerized with the isobutylene in order to form the polyisobutylene block are $C_4$-$C_{14}$ conjugated dienes. Preferably, these conjugated dienes are chosen from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or a mixture thereof. More preferably, the conjugated diene is isoprene or a mixture containing isoprene.

The polyisobutylene block, according to one advantageous aspect of the invention, may be halogenated and made up of halogen atoms in its chain. This halogenation makes it possible to increase the curing rate of the composition comprising the block copolymer according to the invention. This halogenation makes it possible to improve the compatibility of the TPE with the other constituent components of the TPE-based composition used in the pneumatic tire inner liner application. The halogenation takes place by means of bromine or chlorine, preferably bromine, over the units derived from conjugated dienes of the polymer chain of the polyisobutylene block. Only one portion of these units reacts with the halogen. This portion of units derived from conjugated dienes must nevertheless be such that the amount of units derived from conjugated dienes that have not reacted with the halogen is at least 0.5% by weight relative to the weight of the polyisobutylene block.

According to one variant of the invention mentioned above, the polyisobutylene block of the block copolymer may be star-shaped with at least 3 branches. Preferably, the number of branches is within a range extending from 3 to 6.

According to the invention, the terminal styrenic block or blocks represent at most 16% by weight of the total weight of the block copolymer, preferably less than 15% by weight. Beyond this value of 16% by weight an insufficient hot cohesion of the composition comprising the block copolymer according to the invention is observed. This results, in particular, in an increase of the modulus rendering the plastic deformation of this material impossible during the shaping of the tire.

The styrenic block or blocks must be present in sufficient proportions to preserve the thermoplastic nature of the SIBS elastomer. The minimum amount of styrenic blocks of the block copolymer may vary depending on the usage conditions of the copolymer. By way of example, a minimum amount of 5% by weight of the total weight of the block copolymer may be envisaged for a tire application.

The styrenic blocks are composed of one or more polymerized styrenic compounds. The expression "styrenic compound" should be understood, within the present description, as any monomer based on styrene, which is either unsubstituted or substituted; among the substituted styrenes, mention may be made, for example, of: methylstyrenes (for example o-methylstyrene, m-methylstyrene or p-methylstyrene, a-methylstyrene, α,2-dimethylstyrene, α,4-dimethylstyrene or diphenylethylene), butylstyrenes (for example para-tert-butylstyrene), chlorostyrenes (for example o-chlorostyrene, m-chlorostyrene, p-chlorostyrene, 2,4-dichlorostyrene, 2,6-dichlorostyrene or 2,4,6-trichlorostyrene), bromostyrenes (for example o-bromostyrene, m-bromostyrene, p-bromostyrene, 2,4-dibromostyrene, 2,6-dibromostyrene or 2,4,6-tribromostyrene), fluorostyrenes (for example o-fluorostyrene, m-fluorostyrene, p-fluorostyrene, 2,4-difluorostyrene, 2,6-difluorostyrene or 2,4,6-trifluorostyrene) or else para-hydroxystyrene. Preferably, the styrenic compound according to the invention is styrene, a-methylstyrene, diphenylethylene, p-methylstyrene, p-tert-butylstyrene, p-chlorostyrene or p-fluorostyrene.

The copolymers according to the invention may be prepared by synthesis processes that are known per se and are described in the literature, in particular that cited in the presentation of the prior art of the present description. A person skilled in the art will know how to choose suitable polymerization conditions and how to regulate the various parameters of the polymerization processes in order to arrive at the specific structural characteristics of the block copolymer of the invention.

Several synthesis strategies may be used with a view to preparing the copolymers according to the invention.

A first one consists of a first step of synthesis of the "polyisobutylene" block by living cationic polymerization of the monomers to be polymerized using a difunctional or polyfunctional initiator known to a person skilled in the art, followed by the second step of synthesis of the styrenic blocks by addition of the styrenic monomers to be polymerized to the living "polyisobutylene" obtained in the first step. Thus, these two steps are consecutive, which results in the sequenced addition:

of the monomers to be polymerized for the preparation of the "polyisobutylene" block comprising an amount of units derived from one or more conjugated dienes ranging from 0.5% to 6% by weight of the total weight of the isobutylene block; of the monomers to be polymerized for the preparation of the styrenic blocks.

In each step, the monomer(s) to be polymerized may or may not be added in the form of a solution in a solvent as described below, in the presence or absence of a Lewis acid or Lewis base as described below.

Each of these steps may be carried out in the same polymerization reactor or in two different polymerization reactors. Preferably, these two steps are carried out in one and the same reactor ("one-pot" synthesis).

The living cationic polymerization is conventionally carried out using an initiator and optionally a Lewis acid that acts as a co-initiator in order to form a carbocation in situ. Electron-donating compounds are customarily added in order to impart a living character to the polymerization.

By way of illustration, the difunctional or polyfunctional initiators that can be used for the preparation of the copolymers according to the invention may be chosen from 1,4-di(2-methoxy-2-propyl)benzene (or "dicumyl methyl ether"), 1,3,5-tri(2-methoxy-2-propyl)benzene (or "tricumyl methyl ether"), 1,4-di(2-chloro-2-propyl)benzene (or "dicumyl chloride"), 1,3,5-tri(2-chloro-2-propyl)benzene (or "tricumyl chloride"), 1,4-di(2-hydroxy-2-propyl)benzene, 1,3,5-tri(2-hydroxy-2-propyl)benzene, 1,4-di(2-acetoxy-2-propyl)benzene, 1,3,5-tri(2-acetoxy-2-propyl)-benzene, 2,6-dichloro-2,4,4,6-tetramethylheptane and 2,6-dihydroxy-2,4,4,6-heptane. Preferably, dicumyl ethers, tricumyl ethers, dicumyl halides or tricumyl halides are used.

The Lewis acids may be chosen from metal halides of general formula $MX_n$ where M is an element chosen from Ti, Zr, Al, Sn, P and B, and X is a halide such as Cl, Br, F or I; n corresponding to the degree of oxidation of the element M. Mention will be made, for example, of $TiCl_4$, $AlCl_3$, $BCl_3$, $BF_3$, $SnCl_4$, $PCl_3$ or $PCl_5$. The compounds $TiCl_4$, $AlCl_3$ and $BCl_3$ are preferably used, and $TiCl_4$ more preferably still.

The electron-donating compounds may be chosen from known Lewis bases, such as pyridines, amines, amides, esters, sulphoxides, etc. Among these, DMSO (dimethyl sulphoxide) and DMAc (dimethylacetamide) are preferred.

The living cationic polymerization is carried out in an apolar inert solvent or in a mixture of apolar and polar inert solvents.

The apolar solvents that can be used for the synthesis of the copolymers according to the invention are, for example, aliphatic, cycloaliphatic or aromatic hydrocarbon-based solvents, such as hexane, heptane, cyclohexane, methylcyclohexane, benzene or toluene.

The apolar solvents that can be used for the synthesis of the copolymers according to the invention are, for example, halogenated solvents such as alkane halides, such as methyl chloride (or chloroform), ethyl chloride, butyl chloride, methylene chloride (or dichloromethane) or chlorobenzenes (mono-, di- or tri-chloro).

A person skilled in the art will know how to choose the composition of the mixtures of monomers to be used with a view to preparing the copolymers according to the invention and also the temperature conditions that are suitable with a view to attaining the molecular weight characteristics of these copolymers.

A second synthesis strategy consists in separately preparing:

a "polyisobutylene" block that is telechelic or functional at its chain ends by living cationic polymerization using a difunctional or polyfunctional initiator, optionally followed by a functionalization reaction on the chain ends; the living styrenic blocks, for example by anionic polymerization, then in reacting one with the other in order to obtain a copolymer according to the invention. The nature of the reactive functions at each of the chain ends of the block and the proportion of living styrenic blocks relative to the block will be chosen by a person skilled in the art in order to obtain a copolymer according to the invention.

The halogenation of the copolymer according to the invention obtained according to one or the other of the synthesis strategies is carried out according to any method known to a person skilled in the art, in particular those used for the halogenation of butyl rubber, and may take place for example using bromine or chlorine, preferably bromine, on the units derived from conjugated dienes of the polymer chain of the polyisobutylene block.

In certain variants of the invention according to which the SIBS elastomer is star-shaped or else branched, the processes described for example in the articles by Puskas, *J. Polym. Sci Part A: Polymer Chemistry*, Vol. 36, pp. 85-82 (1998) and Puskas, *J. Polym. Sci Part A: Polymer Chemistry*, Vol. 43, pp. 1811-1826 (2005) may be used by analogy in order to obtain living star-shaped, branched or dendritic central "polyisobutylene" blocks. A person skilled in the art will then know how to choose the composition of the mixtures of monomers to be used with a view to preparing the copolymers according to the invention and also the temperature conditions that are suitable with a view to attaining the molecular weight characteristics of these copolymers.

Preferably, the preparation of the copolymers according to the invention will be carried out by living cationic polymerization using a difunctional or polyfunctional initiator and by sequenced addition of the monomers to be polymerized for the synthesis of the "polyisobutene" block and of the monomers to be polymerized for the synthesis of the styrenic blocks.

The present invention is not restricted to a specific polymerization process starting from one such mixture of monomers. This type of process is known to a person skilled in the art. Thus syntheses described in the prior art, in particular in patent documents EP 731 112, U.S. Pat. No. 4,946,899 and U.S. Pat. No. 5,260,383, may be used by analogy to prepare the novel SIBS elastomer according to the invention.

The SIBS elastomer may, on its own, constitute the gastight elastomer layer or else be combined, in this elastomer layer, with other components to form an elastomer composition.

If optional other elastomers are used in this composition, the novel SIBS elastomer according to the invention constitutes the predominant elastomer by weight; it then preferably represents more than 50%, more preferably more than 70% by weight of all of the elastomers. Such additional elastomers, which are preferably in the minority, could be for example diene elastomers such as natural rubber or a synthetic polyisoprene, a butyl rubber or thermoplastic styrene (TPS) elastomers other than SIBS, within the limit of the compatibility of their microstructures.

As a TPS elastomer other than SIBS that can be used in addition to the SIBS described previously, mention may especially be made of a TPS elastomer chosen from the group composed of styrene/butadiene/styrene block copolymers, styrene/isoprene/styrene block copolymers, styrene/isoprene/butadiene/styrene block copolymers, styrene/ethylene-butylene/styrene block copolymers, styrene/ethylene-propylene/styrene block copolymers, styrene/ethylene-ethylene-propylene styrene block copolymers and blends of these copolymers. More preferably, said optional additional TPS elastomer is chosen from the group composed of styrene/ethylene-butylene/styrene block copolymers, styrene/ethylene-propylene/styrene block copolymers and blends of these copolymers.

However, according to one preferred embodiment, the SIBS elastomer is the sole elastomer, and the sole thermoplastic elastomer present in the gastight elastomer layer or composition.

The SIBS elastomer described previously is sufficient by itself for the function of impermeability to gases with respect to the inflatable articles in which it is used to be fulfilled.

However, according to one preferred embodiment of the invention, the latter is used in a composition which also comprises, as a plasticizing agent, an extender oil (or plasticizing oil), the role of which is to facilitate the processing, particularly the integration into the inflatable article via a lowering of the modulus and an increase in the tackifying power of the gastight layer.

Any extender oil may be used, preferably one having a weakly polar character, capable of extending or plasticizing elastomers, especially thermoplastic elastomers. At ambient temperature (23° C.), these oils, which are relatively viscous, are liquids (i.e. as a reminder, substances having the capability of eventually taking the form of their container), as opposed especially to resins or rubbers which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

It should be noted that the addition of an extender oil to the SIBS leads to a loss of impermeability of the latter, which varies depending on the type and amount of oil used. Preferably, a polybutene-type oil, in particular a polyisobutylene (PIB) oil, is used, which demonstrated the best compromise of properties compared with the other oils tested, especially compared with a conventional oil of paraffinic type.

By way of example, polyisobutylene oils are sold in particular by Univar under the trade name "Dynapak Poly" (e.g. "Dynapak Poly 190"), by INEOS Oligomer under the trade name INDOPOL H1200, by BASF under the trade names "Glissopal" (e.g. "Glissopal 1000") or "Oppanol" (e.g. "Oppanol B12"); paraffinic oils are sold for example by Exxon under the trade name "Telura 618" or by Repsol under the trade name "Extensol 51".

The number-average molecular weight ($M_n$) of the extender oil is preferably between 200 and 25,000 g/mol, more preferably still between 300 and 10,000 g/mol. For excessively low $M_n$ weights, there is a risk of the oil migrating to the outside of the composition, whereas excessively high weights may result in this composition becoming too stiff. An $M_n$ weight between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, the specimen being firstly dissolved in tetrahydrofuran with a concentration of about 1 g/l, and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35.degree. C. and the analysis time is 30 min. A set of two WATERS columns with the trade name "STYRAGEL HT6E" is used. The injected volume of the polymer specimen solution is 100 μl. The detector is a WATERS 2410 differential refractometer and its associated software for handling the chromatograph data is the WATERS MILLENNIUM system. The calculated average molecular weights are relative to a calibration curve obtained with polystyrene standards.

A person skilled in the art will know, in the light of the description and the exemplary embodiments that follow, how to adjust the quantity of extender oil according to the particular usage conditions of the gastight elastomer layer, in particular of the inflatable article in which it is intended to be used.

It is preferable for the extender oil content to be greater than 5 phr, preferably between 5 and 100 phr (parts by weight per hundred parts of total elastomer (rubber), that is to say SIBS plus any other possible elastomer present in the elastomer composition or layer).

Below the indicated minimum, the elastomer composition runs the risk of having too high a stiffness for certain applications, whereas above the recommended maximum there is a risk of the composition having insufficient cohesion and of a loss of impermeability which may be damaging depending on the application in question.

For these reasons, in particular for use of the airtight composition in a pneumatic tire, the extender oil content is preferably greater than 10 phr, especially between 10 and 90 phr, more preferably still is greater than 20 phr, especially between 20 and 80 phr.

The airtight layer or composition described above may furthermore comprise the various additives usually present in the airtight layers known to a person skilled in the art. Mention will be made, for example, of reinforcing fillers such as carbon black or silica, non-reinforcing or inert fillers, colourants that can advantageously be used for colouring the composition, platy fillers that further improve the impermeability (e.g. phyllosilicates such as kaolin, talc, mica, graphite, clays or modified clays ("organoclays")), plasticizers other than the aforementioned extender oils, protective agents such as antioxidants or antiozonants, UV stabilizers, various processing aids or other stabilizers, or else promoters capable of promoting adhesion to the remainder of the structure of the inflatable article.

Besides the elastomers (SIBS and other possible elastomers) described previously, the gastight composition could also comprise, always in a minority weight fraction relative to the SIBS elastomer, polymers other than elastomers, such as for example thermoplastic polymers compatible with the SIBS elastomer.

The gastight layer or composition described previously is a compound that is solid (at 23° C.) and elastic, which is especially characterized, owing to its specific formulation, by a very high flexibility and very high deformability.

According to one preferred embodiment of the invention, this gastight layer or composition has a secant extension modulus, at 10% elongation (denoted by M10), which is less than 2 MPa, more preferably less than 1.5 MPa (especially less than 1 MPa). This quantity is measured at first elongation (that is to say without an accommodation cycle) at a temperature of 23° C., with a pull rate of 500 mm/min (ASTM D412 standard), and normalized to the initial cross section of the test specimen.

The layer or composition based on SIBS described previously can be used as an airtight layer in any type of inflatable article. As examples of such inflatable articles, mention may be made of inflatable boats, balloons or balls used for games or sports.

Said composition is particularly suitable for use as an airtight layer (or a layer that is impermeable to any other inflation gas, for example nitrogen) in an inflatable article, whether a finished or semi-finished product, made of rubber, most particularly in a pneumatic tire for a motor vehicle such as a two-wheeled, passenger or industrial vehicle.

Such an airtight layer is preferably placed on the inner wall of the inflatable article, but it may also be completely integrated into its internal structure.

The thickness of the airtight layer is preferably greater than 0.05 mm, more preferably between 0.1 mm and 10 mm (especially between 0.1 and 1.0 mm).

It will be readily understood that, depending on the specific fields of application and on the dimensions and pressures involved, the method of implementing the invention may vary, the airtight layer then having several preferential thickness ranges.

Thus, for example, in the case of passenger vehicle tires, it may have a thickness of at least 0.4 mm, preferably between 0.8 and 2 mm. According to another example, in the case of heavy or agricultural vehicle tires, the preferred thickness may be between 1 and 3 mm. According to another example, in the case of pneumatic tires for vehicles in the civil engineering field or for aircraft, the preferred thickness may be between 2 and 10 mm.

Compared with a usual airtight layer based on butyl rubber, the airtight composition described above has the advantage of exhibiting a substantially lower hysteresis, and therefore is predicted to give the pneumatic tires a reduced rolling resistance.

Furthermore, this novel SIBS elastomer induces, in the airtight composition that contains it, a high capacity for adhesion to the rubber components of the inflatable article, in particular pneumatic tire, which are adjacent thereto.

In addition, this novel SIBS elastomer, despite its thermoplastic nature, gives the airtight composition that contains it good hot cohesion of the material, in particular at temperatures ranging from 150 to 200° C. These temperatures correspond to the curing temperatures of pneumatic tires. This high-temperature cohesion enables these tires to be demoulded at high temperature without adversely affecting the integrity of the airtight composition containing the novel SIBS elastomer.

Therefore, the novel thermoplastic SIBS elastomer according to the invention surprisingly makes it possible to reach a satisfactory compromise between the often antinomic properties of hot cohesion of the composition that contains it and of adhesion of this composition to the rubber compositions which are adjacent thereto in the inflatable article. This compromise of properties is achieved while retaining the impermeability properties and the processability of the composition comprising this SIBS, and also while imparting improved hysteresis properties (compared to butyl rubber) as an inner liner for a pneumatic tire.

BRIEF DESCRIPTION OF THE SINGLE DRAWING

The invention and also its advantages will be easily understood in light of the description and also the single FIGURE which schematically represents, in radial cross section, a pneumatic tire according to an embodiment of the invention.

DETAILED DESCRIPTION OF THE SINGLE DRAWING

The gastight elastomer layer described previously can advantageously be used in the pneumatic tires of all types of vehicles, in particular passenger vehicles or industrial vehicles such as heavy vehicles.

As an example, the single appended FIGURE shows, very schematically (not drawn to a specific scale), a radial cross section of a pneumatic tire according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotation axis of the pneumatic tire, which is located at mid-distance of the two beads 4 and passes through the middle of the crown reinforcement 6).

The inner wall of the pneumatic tire 1 comprises an airtight layer 10, for example having a thickness equal to around 0.9 mm, on the side of the internal cavity 11 of the pneumatic tire 1.

This inner layer (or "inner liner") covers the entire inner wall of the pneumatic tire, extending from one sidewall to the other, at least as far as the rim flange when the pneumatic tire is in the fitted position. It defines the radially internal face of said tire, which face is intended to protect the carcass reinforcement from the diffusion of air coming from the internal space 11 of the tire. It enables the pneumatic tire to be inflated and kept under pressure. Its sealing properties ought to enable it to guarantee a relatively low rate of pressure loss, and to make it possible to keep the tire inflated, in the normal operating state, for a sufficient time, normally several weeks or several months.

Unlike a conventional pneumatic tire that uses a composition based on butyl rubber, the pneumatic tire according to the invention uses, in this example, as the airtight layer 10, a novel SIBS elastomer as described above.

The pneumatic tire provided with its airtight layer (10) as described above may be produced before or after vulcanization (or curing).

In the first case (i.e., before curing of the pneumatic tire), the airtight layer is simply applied in a conventional manner at the desired place, so as to form the layer 10. The vulcanization is then carried out conventionally. The SIBS elastomers are well able to withstand the stresses associated with the vulcanization step.

One manufacturing variant that is advantageous, for a person skilled in the art of pneumatic tires, would consist for example during a first step, in laying down the airtight layer directly onto a building drum, in the form of a skim with a suitable thickness, before this is covered with the rest of the structure of the pneumatic tire, according to manufacturing techniques well known to a person skilled in the art.

In the second case (i.e. after curing of the pneumatic tire), the airtight layer is applied to the inside of the pneumatic tire cured by any appropriate means, for example by bonding, by spraying or else by extrusion and blow moulding a film of suitable thickness.

The invention claimed is:

1. An inflatable article having a vulcanized airtight layer, wherein said airtight layer comprises at least, as the predominant elastomer, a thermoplastic SIBS elastomer in the form of a block copolymer composed:
   1) of a polyisobutylene block having a number-average molecular weight ranging from 25,000 g/mol to 350,000 g/mol and a glass transition temperature of less than or equal to −20° C., and comprising an amount of units derived from one or more conjugated dienes inserted in the polymer chain ranging from 0.5% to 6% by weight relative to the weight of the polyisobutylene block; and
   2) at least one of the ends of the polyisobutylene block, of a styrenic block composed of at least one polymerized styrenic compound, the styrenic blocks representing at most 16% by weight of the total weight of the block copolymer;
   wherein said inflatable article is a pneumatic tire.

2. The inflatable article according to claim 1, wherein the copolymer has a linear triblock structure.

3. The inflatable article according to claim 1, wherein the copolymer has a star-shaped structure with at least 3 branches and at most 12 branches in which the central polyisobutylene block is star-shaped with at least 3 and at most 12 branches, each branch being terminated by a styrenic block.

4. The inflatable article according to claim 1, wherein the copolymer has a dendrimer structure in which the central polyisobutylene block is dendritic, each of the branches of the dendritic polyisobutylene being terminated by a styrenic block.

5. The inflatable article according to claim 1, wherein the polyisobutylene block comprises an amount of units derived from one or more conjugated dienes inserted in the polymer chain ranging from 1.5% to 5% by weight relative to the weight of the polyisobutylene block.

6. The inflatable article according to claim 1, wherein the polyisobutylene block has a glass transition temperature of less than or equal to −50° C.

7. The inflatable article according to claim 1, wherein the conjugated diene or dienes are chosen from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or a mixture thereof.

8. The inflatable article according to claim 1, wherein the polyisobutylene block is halogenated.

9. The inflatable article according to claim 1, wherein the styrenic blocks represent less than 15% by weight of the total weight of the block copolymer.

10. The inflatable article according to claim 1, wherein the styrenic compound is chosen from styrene, methylstyrenes, chlorostyrenes and bromostyenes.

11. The inflatable article according to claim 10, wherein the styrenic compound is styrene, a-methylstyrene, diphenylethylene, p-methylstyrene, p-tert-butylstyrene, p-chlorostyrene or p-fluorostyrene.

12. The inflatable article according to claim 11, wherein the styrenic compound is styrene.

13. The inflatable article according to claim 1, wherein the weight $M_n$ of the SIBS elastomer is between 40,000 and 400,000 g/mol.

14. The inflatable article according to claim 1, wherein the airtight layer comprises an extender oil.

15. The inflatable article according to claim 14, wherein the extender oil is chosen from the group composed of polyolefin oils, paraffinic oils, naphthenic oils, aromatic oils, mineral oils, and mixtures of these oils.

16. The inflatable article according to claim 15, wherein the extender oil is a polyisobutylene oil.

17. The inflatable article according to claim 14, wherein the number-average molecular weight ($M_n$) of the extender oil is between 350 and 4000 g/mol.

18. The inflatable article according to claim 17, wherein the content of extender oil is greater than 5 phr, preferably between 5 and 100 phr.

19. The inflatable article according to claim 1, wherein the airtight layer has a thickness between 0.1 mm and 10 mm.

20. The inflatable article according to claim 19, wherein the airtight layer is positioned on the inner wall of the inflatable article.

21. A process for sealing an inflatable article with respect to inflation gases, wherein the airtight layer as defined in claim 1 is incorporated into said inflatable article during its manufacture or is added to said inflatable article after its manufacture, wherein the inflatable article is a pneumatic tire.

22. The process according to claim 21, wherein the airtight layer is deposited on the inner wall of the inflatable article.

23. The process according to claim 21, wherein, during a first step, the airtight layer is laid down directly onto a building drum, before said airtight layer is covered with the rest of the structure of the pneumatic tire.

* * * * *